United States Patent
Lackey et al.

(10) Patent No.: US 6,295,805 B1
(45) Date of Patent: Oct. 2, 2001

(54) EXHAUST INDUCED EJECTOR NOZZLE SYSTEM AND METHOD

(75) Inventors: Jesse R. Lackey, Aledo; Jeffrey A. Catt, Benbrook, both of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/662,263

(22) Filed: Sep. 14, 2000

(51) Int. Cl.[7] ................. F02K 1/12; F02K 1/82; F02K 1/36
(52) U.S. Cl. .............. 60/204; 239/127.3; 239/265.17; 60/266
(58) Field of Search ............. 60/266, 204; 239/127.3, 239/265.17

(56) References Cited

U.S. PATENT DOCUMENTS

| | | | |
|---|---|---|---|
| 3,370,794 | * 2/1968 | Drewry et al. | 239/127.3 |
| 3,575,260 | * 4/1971 | Urguhart | 239/127.3 |
| 3,726,091 | * 4/1973 | Tontini | 239/265.17 |
| 5,255,849 | 10/1993 | Mayer et al. | 239/127.3 |
| 5,435,127 | 7/1995 | Luffy et al. | 60/204 |
| 5,577,381 | 11/1996 | Eigenbrode et al. | 60/226.1 |
| 5,586,431 | 12/1996 | Thonebe et al. | 60/226.1 |
| 5,720,434 | 2/1998 | Vdoviak et al. | 239/127.1 |
| 5,761,899 | 6/1998 | Klees | 60/204 |
| 5,884,843 | 3/1999 | Lidstone et al. | 239/265.13 |
| 5,996,936 | * 12/1999 | Mueller | 239/265.17 |

* cited by examiner

Primary Examiner—Ted Kim
(74) Attorney, Agent, or Firm—Baker Botts L.L.P.

(57) ABSTRACT

An exhaust induced ejector nozzle (20) includes a convergent portion (30) and a divergent portion (34) disposed downstream from the convergent portion (30). The ejector nozzle (20) also includes an ejector (40) having an outlet (46) disposed within the divergent portion (34). The ejector (40) is operable to provide entrainment of a nacelle airflow (18) from a nacelle airflow area (44) into the divergent portion (34). The ejector nozzle (20) further includes a convergent ejector (60) extending between the convergent portion (30) and the nacelle airflow area (44). The convergent ejector (60) is operable to draw a portion of an exhaust airflow (42) into the nacelle airflow area (44) to increase a flow rate of the nacelle airflow (18).

20 Claims, 3 Drawing Sheets

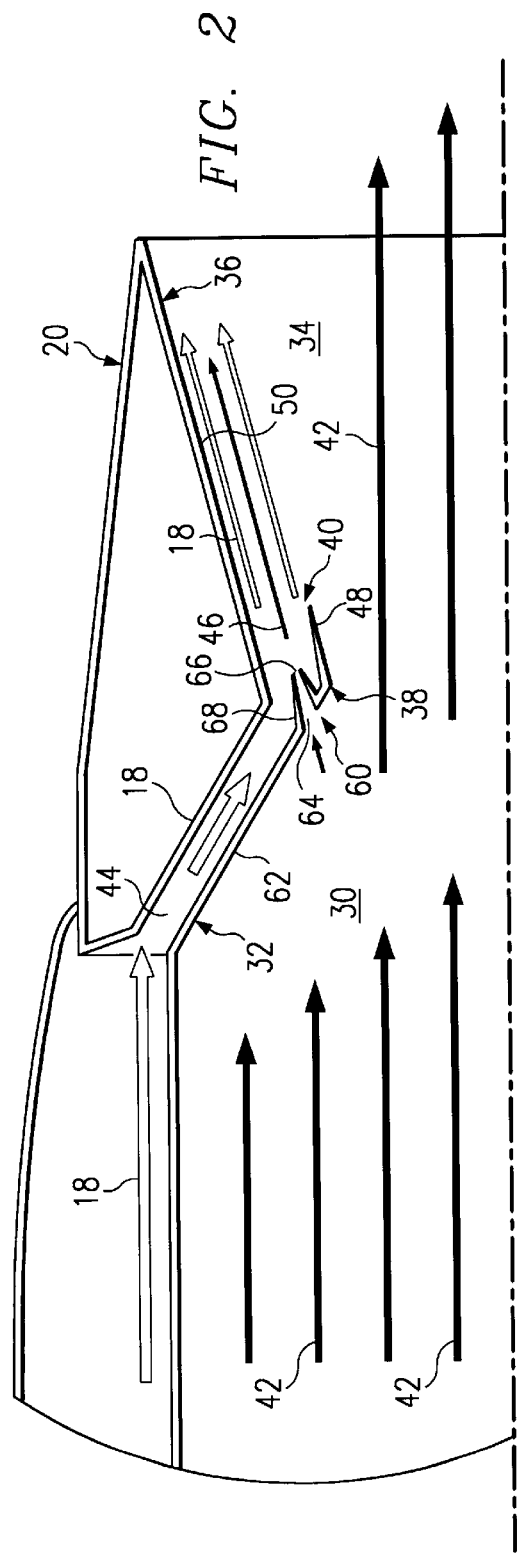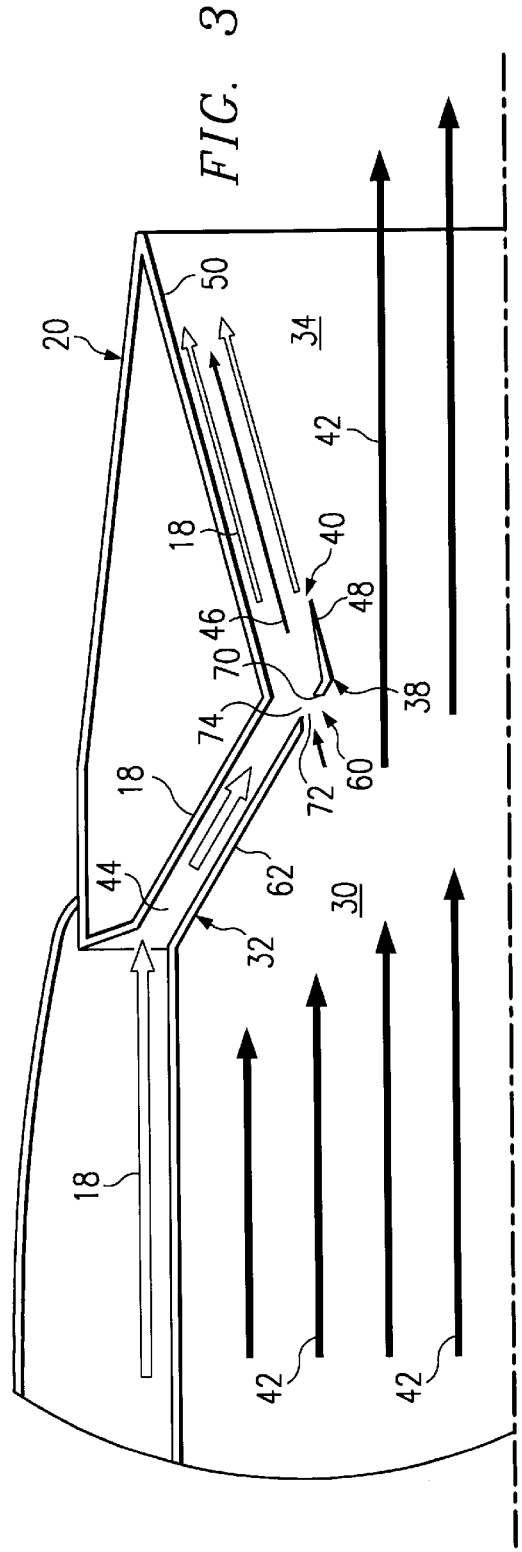

EXHAUST INDUCED EJECTOR NOZZLE SYSTEM AND METHOD

TECHNICAL FIELD OF THE INVENTION

This invention relates generally to the field of aircraft propulsion and, more particularly, to an exhaust induced ejector nozzle system and method.

BACKGROUND OF THE INVENTION

Aircraft gas turbine engines generally employ exhaust or ejector nozzles having flaps and seals that are used to contain exhaust flow from the engine and use thrust to propel the aircraft. The nozzle is generally designed for supersonic operation and includes a convergent portion for accelerating the exhaust airflow at the nozzle throat and a divergent portion for accelerating the exhaust airflow supersonically.

Cooling of the nozzle is generally required to provide thermal protection to the nozzle and fire protection to the aircraft engine. Cooling is generally provided by diverting a source of nacelle or ambient air around the aircraft engine and into the divergent portion of the nozzle using an ejector. The ejector is generally located in the divergent portion of the nozzle such that the exhaust airflow, being at a higher velocity and higher pressure, draws lower velocity and lower pressure cooling air into the nozzle to cool the nozzle.

Preventing the exhaust airflow from escaping the aircraft engine and migrating into a nacelle where the accumulated exhaust airflow may combust or cause a fire or explosion is also important. The ejector reduces the likelihood of the exhaust airflow migrating into a nacelle by withdrawing air in the nacelle into the divergent portion of the nozzle.

However, present nozzles suffer from several disadvantages. For example, airflow from the nacelle is strongly dependent on the nacelle inlet characteristics, the nozzle schedule, the ejector characteristics, and the flight envelope of the aircraft. Thus, it is generally difficult to provide all the required nacelle airflow in all regions of the flight envelope without having a negative impact on aircraft and/or engine performance or negative impacts to airframe strength. For example, particular flight envelope conditions may result in a reduced or negative pressure differential between the nacelle and the divergent portion of the nozzle, thereby reducing or reversing the airflow in the nacelle creating a fire hazard.

SUMMARY OF THE INVENTION

Accordingly, a need has arisen for an improved ejector nozzle system and method that provides improved nacelle airflow while being less sensitive to a flight envelope of an aircraft. The present invention provides an improved ejector nozzle system and method that addresses shortcomings of prior ejector nozzle systems and methods.

According to one embodiment of the invention, an ejector nozzle includes a convergent portion and a divergent portion disposed downstream from the convergent portion. The ejector nozzle also includes an ejector having an outlet disposed within the divergent portion. The ejector is operable to provide entrainment of a nacelle airflow from a nacelle airflow area into the divergent portion. The ejector nozzle further includes a convergent ejector extending between the convergent portion and the nacelle airflow area. The convergent ejector is operable to draw a portion of an exhaust airflow into the nacelle airflow area to increase a flow rate of the nacelle airflow.

According to another embodiment of the invention, a method for enhanced ejector nozzle cooling includes receiving a nacelle airflow into a nacelle airflow area. The method also includes entraining the nacelle airflow from the nacelle airflow area into a divergent portion of the ejector nozzle using an exhaust airflow. The method further includes enhancing a flow rate of the nacelle airflow by drawing a portion of the exhaust flow into a convergent ejector. The convergent ejector extends between a convergent portion of the ejector nozzle and the nacelle airflow area.

The invention provides several technical advantages. For example, in one embodiment of the invention, exhaust airflow flowing through the convergent ejector provides additional motive flow or pumping to increase the flow rate of the nacelle airflow at all flight conditions. Additionally, the ejector nozzle of the present invention provides additional nacelle airflow without tapping into bleed air as a source of energy.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in connection with the accompanying drawings in which:

FIG. 2 is a diagram illustrating an exhaust induced ejector nozzle in accordance with an embodiment of the present invention;

FIG. 3 is a diagram illustrating an exhaust induced ejector nozzle in accordance with another embodiment the present invention;

DETAILED DESCRIPTION OF THE INVENTION

Figure 1:
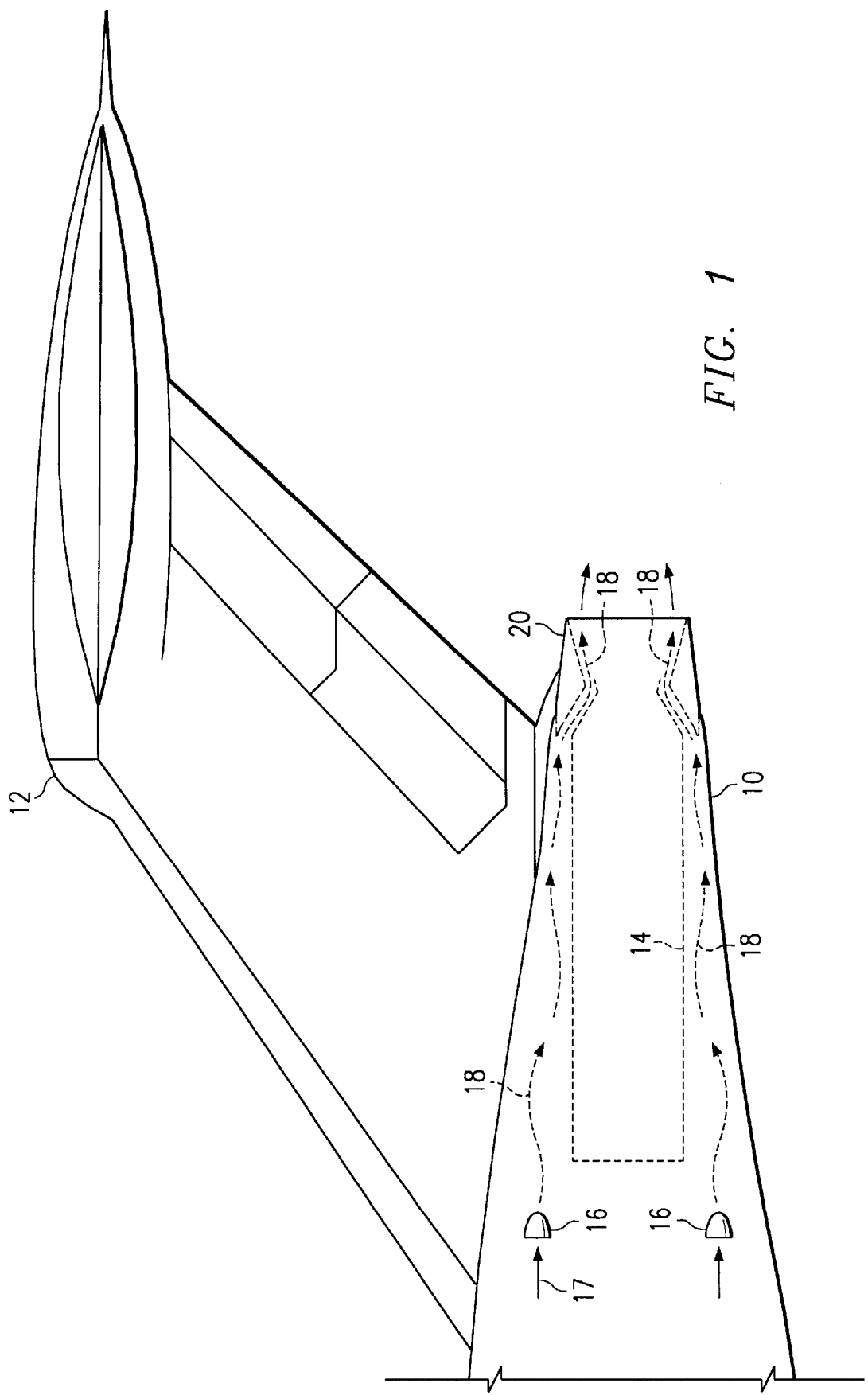
FIG. 1 is a diagram illustrating a portion of an aircraft having an ejector nozzle.

FIG. 1 is a diagram illustrating a tail section 10 of an aircraft 12. Aircraft 12 includes an engine 14 and one or more inlets 16 disposed forward of engine 14 for receiving an ambient airflow 17 to provide a nacelle airflow 18 for cooling engine 14. However, nacelle airflow 18 may be otherwise received and directed toward ejector nozzle to provide cooling for engine 14. In the embodiment illustrated in FIG. 1, engine 14 is disposed in a rearward portion of aircraft 12 and includes an exhaust or ejector nozzle 20 for producing thrust to propel aircraft 12. However, it should be understood that engine 14 may be located at other suitable locations of aircraft 12.

FIG. 2 is a diagram illustrating an exhaust induced ejector nozzle 20 in accordance with an embodiment of the present invention. Ejector nozzle 20 comprises a convergent portion 30 formed by circumferentially disposed convergent seals/flaps 32 and a divergent portion 34 formed by circumferentially disposed divergent seals/flaps 36. A variable area throat 38 is disposed between convergent portion 30 and divergent portion 34 resulting from pivotal movement of convergent seals/flaps 32 and divergent seals/flaps 36. In operation, pivotal movement of convergent seals/flaps 32 and divergent seals/flaps 36 vary the area of throat 38 to provide subsonic and supersonic thrust to propel aircraft 12.

As illustrated in FIG. 2, ejector nozzle 20 also includes an ejector 40 for providing cooling and fire suppression for engine 14. For example, exhaust airflow 42 being at a generally high velocity and high pressure passes through convergent portion 30 and into divergent portion 34 and entrains nacelle airflow 18 through an ejector airflow area 44 and into divergent portion 34. Ejector 40 generally comprises an outlet 46 disposed between a forward section 48 of divergent seals/flaps 36 and aft section 50 of divergent seals/flaps 36. Thus, nacelle airflow 18, being at a generally lower pressure and velocity than exhaust airflow 42, is entrained from ejector airflow area 44 into divergent, portion of 34 where relatively cool nacelle airflow 18 cools divergent seals/flaps 36. The entrained nacelle air flow also cools the convergent seals/flaps 32, engine 14 and ejector nozzle 20.

In the embodiment illustrated in FIG. 2, ejector nozzle 20 also includes a convergent ejector 60. Convergent ejector 60 is disposed forward of throat 38 and extends from convergent portion 30 to nacelle airflow area 44 through a wall 62 of convergent flap 32. Convergent ejector 60 comprises an inlet 64 disposed proximate exhaust airflow 42 and an outlet 66 disposed proximate nacelle airflow 18. In the embodiment illustrated in FIG. 2, convergent ejector 60 generally comprises a conically configured nozzle 68 having a diameter of inlet 64 greater than a diameter of outlet 66. However, other suitable geometric configurations may be used for convergent ejector 60.

In operation, the pressure differential between the generally higher pressure exhaust airflow 42 and the generally lower pressure nacelle airflow 18 causes a portion of exhaust airflow 42 to be drawn through convergent ejector 60 and into ejector airflow area 44. Additionally, as illustrated in FIG. 2, convergent ejector 60 is disposed forward of throat 38 such that convergent seals/flaps 32 of convergent portion 30 cause inlet 64 to be directed in a generally forward direction for receiving a portion of exhaust flow 42. As exhaust airflow 42 passes through nozzle 68, the velocity of exhaust airflow 42 increases and is released into inner layers of nacelle airflow 18 within ejector airflow area 44. Thus, the generally higher velocity exhaust airflow 42 entering ejector airflow area 44 induces additional motive flow in the nacelle airflow 18 by increasing the interactive surface area. Therefore, convergent ejector 60 causes and increase in the flow rate of nacelle airflow 18, thereby purging the nacelle of flammable gases, providing an aerodynamic firewall, and providing cooling for ejector nozzle 20.

FIG. 3 is a diagram illustrating ejector nozzle 20 in accordance with another embodiment of the present invention. In this embodiment, convergent ejector 60 generally comprises a chamfered opening 70 disposed in wall 62 of convergent seals/flaps 32. Opening 70 generally comprises an inlet 72 disposed proximate exhaust airflow 42 and an outlet 74 disposed proximate nacelle airflow 18. As illustrated in FIG. 3, opening 70 is disposed forward of throat 38 such that convergent seals/flaps 32 of convergent portion 30 cause opening 70 to be directed in a generally forward direction for receiving a portion of exhaust airflow 42. Inlet 72 is sized generally larger than outlet 74 such that an increase in velocity of exhaust airflow 42 occurs as exhaust airflow 42 passes through opening 70. Thus, in operation, as exhaust airflow 42 passes through convergent portion 30, a portion of exhaust airflow 42 enters opening 70 of convergent ejector 60 and into nacelle airflow 18. As exhaust flow 42 travels through opening 70, the velocity of exhaust airflow 42 passing through opening 70 increases such that the generally higher velocity exhaust airflow 42 is released into the inner layers of nacelle airflow 18 within ejector airflow area 44, thereby inducing additional motive flow in nacelle airflow 18.

Figure 4:
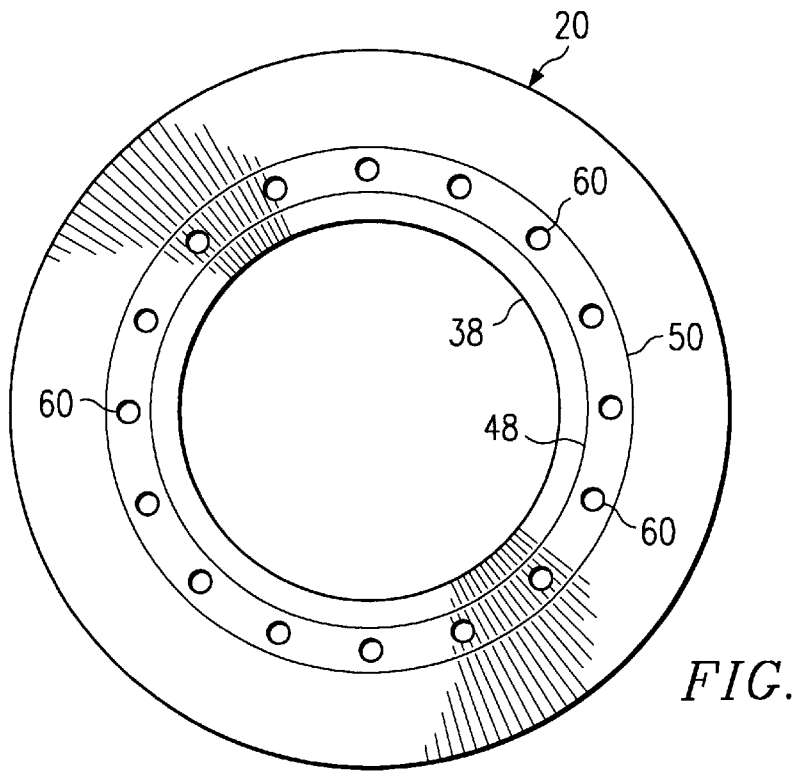
FIG. 4 is a diagram illustrating a forward view of an exhaust induced ejector nozzle in accordance with an embodiment of the present invention.

FIG. 4 is a diagram illustrating a view looking forward of ejector nozzle 20 in accordance with an embodiment of the present invention. In this embodiment, convergent ejectors 60 are disposed concentrically about convergent seals/flaps 32 in a generally uniform spaced apart relationship to each other such that convergent ejectors 60 provide a generally uniform flow rate increase in nacelle airflow 18. In this embodiment, convergent ejectors 60 may include a plurality of nozzles 68 or chamfered openings 70 concentrically spaced about convergent portion 30. For example, nozzles 68 or openings 70 may be configured having a generally converging circular or elliptical geometry; however, other suitable geometric configurations may also be used for convergent ejectors 60 to provide exhaust airflow 42 input into nacelle airflow 18 within ejector airflow area 44.

Figure 5:
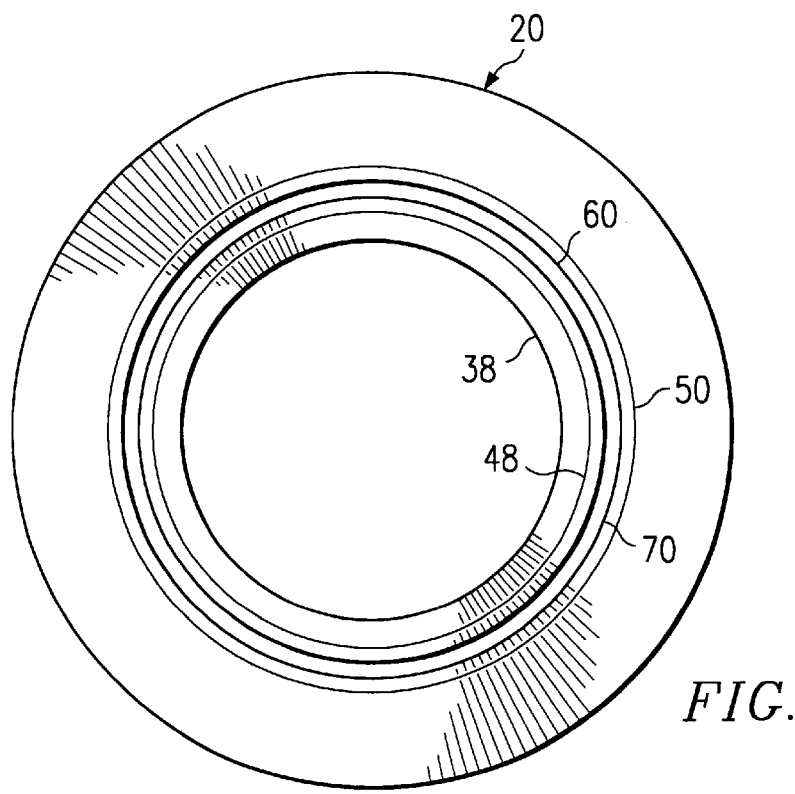
FIG. 5 is a diagram illustrating a forward view of an exhaust induced ejector nozzle in accordance with another embodiment of the present invention.

FIG. 5 is a diagram illustrating a view looking forward of ejector nozzle 20 in accordance with another embodiment of the present invention. In this embodiment, convergent ejector 60 comprises chamfered opening 70 disposed concentrically and extending substantially continuously about convergent seals/flaps 32. For example, chamfered opening 70 may comprise a generally slotted configuration having inlet 72 sized generally larger than outlet 74 such that a velocity increase results in exhaust airflow 42 as exhaust airflow 42 passes through convergent ejector 60. Thus, as exhaust airflow 42 passes through convergent ejector 60, generally higher velocity exhaust airflow 42 enters nacelle airflow area 44 and induces additional motive flow of nacelle airflow 18 disposed within ejector airflow area 44, thereby entraining additional nacelle airflow 18 through ejector 40. Therefore, the present invention provides an aerodynamic firewall, while purging the nacelle of any flammable gases and providing cooling for ejector nozzle 20.

Therefore, the present invention provides an exhaust induced ejector nozzle 20 that provides greater nacelle airflow 18 than prior ejector nozzles by injecting a portion of the exhaust airflow 42 from engine 14 into nacelle airflow 18, thereby providing additional motive flow of nacelle airflow 18. Additionally, the present invention provides additional motive flow of nacelle airflow 18 while purging flammable gases from the nacelle and nacelle airflow area 44, an aerodynamic firewall, and cooling of engine 14 and ejector nozzle 20.

Although the present invention and its advantages have been described in detail, it should be understood that various changes, substitutions and alterations can be made therein without departing from the spirit and scope of the present invention as defined by the appended claims.

What is claimed is:

1. An ejector nozzle, comprising:
    a convergent portion;
    a divergent portion disposed downstream from the convergent portion;
    a nacelle airflow area located at the convergent portion and extending into the divergent portion;
    an ejector having an outlet disposed within the divergent portion, the ejector operable to provide entrainment of nacelle airflow from the nacelle airflow area into the divergent portion; and
    a convergent ejector extending between the convergent portion and the nacelle airflow area, the convergent ejector operable to draw a portion of an exhaust airflow into the nacelle airflow area to increase a flow rate of the nacelle airflow.

2. The ejector nozzle of claim 1, wherein the convergent ejector comprises a converging inlet formed in a wall of the convergent portion.

3. The ejector nozzle of claim 1, wherein the convergent ejector comprises a converging nozzle having an inlet and an outlet, the inlet disposed proximate the exhaust flow and the outlet of the converging nozzle disposed within the nacelle airflow.

4. The ejector nozzle of claim 3, wherein the converging nozzle is constructed having a substantially conical configuration, and wherein a diameter of the inlet is greater than a diameter of the outlet.

5. The ejector nozzle of claim 1, wherein the convergent ejector comprises a converging slot having an inlet and an outlet, the inlet disposed proximate the exhaust flow and the outlet of the converging slot disposed proximate the nacelle airflow.

6. A method for enhanced ejector nozzle cooling, comprising:
receiving a nacelle airflow into a nacelle airflow area located between a convergent portion of the ejector nozzle and extending to a divergent portion of the nozzle;
entraining the nacelle airflow from the nacelle airflow area into the divergent portion of the ejector nozzle using an exhaust airflow; and
enhancing a flow rate of the nacelle airflow by drawing a portion of the exhaust flow into a convergent ejector, the convergent ejector extending between the convergent portion of the ejector nozzle and the nacelle airflow area.

7. The method of claim 6, wherein drawing a portion of the exhaust airflow comprises drawing a portion of the exhaust airflow into a converging inlet disposed in a wall of the convergent portion.

8. The method of claim 6, wherein drawing a portion of the exhaust airflow comprises drawing a portion of the exhaust airflow into a converging slot, the converging slot having an inlet disposed proximate the exhaust airflow and an outlet disposed proximate the nacelle airflow area.

9. The method of claim 6, wherein drawing a portion of the exhaust airflow comprises drawing a portion of the exhaust airflow into a converging nozzle, the converging nozzle having an inlet disposed proximate the convergent portion and an outlet disposed within the nacelle airflow.

10. The method of claim 9, wherein the converging nozzle is constructed having a substantially conical configuration, wherein a diameter of the inlet is greater than a diameter of the outlet.

11. An ejector nozzle, comprising:
a convergent portion;
a divergent portion;
a variable throat area disposed between the convergent portion and the divergent portion;
a nacelle airflow area located at the convergent portion and extending into the divergent portion;
an ejector disposed downstream of the throat area and operable to entrain nacelle airflow from the nacelle airflow area into the divergent portion using an exhaust airflow; and
a convergent ejector disposed forward of the throat area and operable to draw a portion of the exhaust airflow from the convergent portion into the nacelle airflow area to enhance a flow rate of the nacelle airflow.

12. The system of claim 11, wherein the convergent ejector comprises a converging nozzle having an inlet and an outlet, the inlet disposed proximate the exhaust airflow and the outlet disposed within the nacelle airflow.

13. The system of claim 11, wherein the convergent ejector comprises a converging slot having an inlet and an outlet, the inlet disposed proximate the exhaust airflow and the outlet disposed proximate the nacelle airflow.

14. An ejector nozzle for an aircraft engine, comprising:
a convergent portion passing engine exhaust airflow;
a divergent portion disposed downstream from the convergent portion and receiving the engine exhaust airflow from the convergent portion;
a nacelle airflow area located at the convergent portion and extending into the divergent portion;
an ejector having an outlet disposed within the divergent portion, the ejector operable to provide entrainment of nacelle airflow from the nacelle airflow area of the aircraft engine into the exhaust airflow passing through the divergent portion; and
a convergent ejector positioned between the convergent portion and the nacelle airflow area, the convergent ejector drawing a portion of the exhaust airflow into the nacelle airflow area to increase a flow rate of the nacelle airflow, wherein the convergent ejector comprises a plurality of converging openings disposed in a spaced apart relationship relative to each other and extending concentrically about the convergent portion.

15. The ejector nozzle of claim 14, wherein each of the converging openings comprises an inlet disposed proximate the exhaust flow and an outlet disposed proximate the nacelle airflow.

16. An ejector nozzle for an aircraft engine, comprising:
a convergent portion passing engine exhaust airflow;
a divergent portion disposed downstream from the convergent portion and receiving the engine exhaust airflow from the convergent portion;
a nacelle airflow area located at the convergent portion aid extending into the divergent portion;
an ejector having an outlet disposed within the divergent portion, the ejector operable to provide entrainment of nacelle airflow from the nacelle airflow area of the aircraft engine into the exhaust airflow passing through the divergent portion; and
a convergent ejector positioned between the convergent portion and the nacelle airflow area, the convergent ejector drawing a portion of the exhaust airflow into the nacelle airflow area to increase a flow rate of the nacelle airflow, wherein the convergent ejector comprises a plurality of spaced apart converging nozzles extending concentrically about the convergent portion.

17. A method for enhancing aircraft engine ejector nozzle cooling, comprising:
receiving a nacelle airflow into a nacelle airflow area located between a convergent portion of the ejector nozzle and extending to a divergent portion of the nozzle;
entraining the nacelle airflow from the nacelle airflow area of the aircraft engine into an exhaust airflow passing through the divergent portion of the ejector nozzle;
enhancing the flow rate of the nacelle airflow by drawing a portion of the exhaust airflow into a convergent ejector, the convergent ejector extending between the convergent portion of the ejector nozzle of the aircraft engine and the nacelle airflow area; and
wherein drawing a portion of the exhaust airflow comprises drawing a portion of the exhaust airflow into a plurality of spaced apart converging inlets disposed concentrically about the convergent portion.

18. A method for enhancing aircraft engine ejector nozzle cooling, comprising:

receiving a nacelle airflow into a nacelle airflow area located between a convergent portion of the ejector nozzle and extending to a divergent portion of the nozzle;

entraining the nacelle airflow from the nacelle airflow area of the aircraft engine into an exhaust airflow passing through the divergent portion of the ejector nozzle;

enhancing the flow rate of the nacelle airflow by drawing a portion of the exhaust airflow into a convergent ejector, the convergent ejector extending between the convergent portion of the ejector nozzle of the aircraft engine and the nacelle airflow area; and wherein drawing a portion of the exhaust airflow comprises drawing a portion of the exhaust airflow into a plurality of converging nozzles, the converging nozzles disposed in a spaced apart relationship relative to each other and extending concentrically about the convergent portion, each converging nozzle having an inlet disposed proximate the exhaust airflow and an outlet disposed within the nacelle airflow.

19. An ejector nozzle for an aircraft engine, comprising:

a convergent portion passing engine exhaust airflow;

a divergent portion receiving the engine exhaust airflow passing through the convergent portion;

a variable throat area disposed between the convergent portion and the divergent portion;

a nacelle airflow area located at the convergent portion and extending into the divergent portion;

an ejector disposed downstream in the exhaust airflow from the variable throat area and operable to entrain nacelle airflow from the nacelle airflow area of the aircraft engine into the exhaust airflow passing through the divergent portion; and a convergent ejector positioned forward of the variable throat area and drawing a portion of the exhaust airflow from the convergent portion into the nacelle airflow area to enhance a flow rate of the nacelle airflow, wherein the convergent ejector comprises a plurality of converging openings disposed in a spaced apart relationship relative to each other and extending concentrically about the convergent portion.

20. The system of claim 19, wherein the convergent ejector comprises a plurality of spaced apart converging nozzles extending concentrically about the convergent portion, each converging nozzle having an inlet disposed proximate the exhaust airflow and an outlet disposed within the nacelle airflow.

* * * * *